US011923571B2

(12) United States Patent
Nonoyama

(10) Patent No.: US 11,923,571 B2
(45) Date of Patent: Mar. 5, 2024

(54) AIR-COOLED FUEL CELL SYSTEM

(71) Applicant: TOYOTA JIDOSHA KABUSHIKI KAISHA, Toyota (JP)

(72) Inventor: Nobuaki Nonoyama, Chiryu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/804,684

(22) Filed: May 31, 2022

(65) Prior Publication Data

US 2022/0393192 A1  Dec. 8, 2022

(30) Foreign Application Priority Data

Jun. 2, 2021 (JP) .................................. 2021-092784

(51) Int. Cl.
*H01M 8/04014* (2016.01)
*H01M 8/04082* (2016.01)
*H01M 8/04089* (2016.01)
*H01M 8/0432* (2016.01)
(Continued)

(52) U.S. Cl.
CPC ... *H01M 8/04014* (2013.01); *H01M 8/04089* (2013.01); *H01M 8/04201* (2013.01); *H01M 8/04358* (2013.01); *H01M 8/04768* (2013.01); *H01M 2008/1095* (2013.01); *H01M 2220/20* (2013.01)

(58) Field of Classification Search
None
See application file for complete search history.

(56) References Cited

U.S. PATENT DOCUMENTS

| 3,473,963 A * | 10/1969 | Sanderson | .......... H01M 8/0662 |
| | | | 429/410 |
| 2004/0072046 A1 * | 4/2004 | Schmidt | ............ H01M 8/04089 |
| | | | 429/410 |
| 2005/0170223 A1 | 8/2005 | Okazaki | |

(Continued)

FOREIGN PATENT DOCUMENTS

| JP | H02021102 B2 | 5/1990 |
| JP | 2001015136 A | 1/2001 |

(Continued)

OTHER PUBLICATIONS

JP2006140165A—machine translation (Year: 2006).*

*Primary Examiner* — Haroon S. Sheikh
(74) *Attorney, Agent, or Firm* — Hunton Andrews Kurth LLP

(57) ABSTRACT

To provide an air-cooled fuel cell system configured to efficiently warm up a fuel cell. An air-cooled fuel cell system, wherein the air-cooled fuel cell system comprises: a fuel cell, a reaction air supplier configured to supply reaction air to a reaction air inlet of the fuel cell, a reaction air supply flow path configured to connect the reaction air supplier and the reaction air inlet of the fuel cell, a reaction air discharge flow path configured to connect a reaction air outlet of the fuel cell and the outside of the air-cooled fuel cell system, a housing, a temperature acquirer configured to acquire a temperature of inside air discharged from a cooling air outlet, and a controller; and wherein, based on the temperature measured by the temperature acquirer, the controller controls opening and closing of the opening and closing unit and an opening degree thereof.

2 Claims, 3 Drawing Sheets

(51) Int. Cl.
*H01M 8/04746* (2016.01)
*H01M 8/10* (2016.01)

(56) References Cited

U.S. PATENT DOCUMENTS

| | | | | |
|---|---|---|---|---|
| 2012/0214077 A1* | 8/2012 | Garrettson | ........ | H01M 8/04228 |
| | | | | 429/429 |
| 2013/0302713 A1* | 11/2013 | Yamamoto | ........ | H01M 8/04761 |
| | | | | 429/513 |
| 2015/0004503 A1* | 1/2015 | Yamamoto | ........ | H01M 8/04228 |
| | | | | 429/442 |
| 2017/0012304 A1* | 1/2017 | Pelch | ................ | H01M 8/04014 |
| 2017/0352897 A1* | 12/2017 | Adcock | ............ | H01M 8/04701 |

FOREIGN PATENT DOCUMENTS

| | | | |
|---|---|---|---|
| JP | 2005216783 A | | 8/2005 |
| JP | 2006140165 A | * | 6/2006 |
| JP | 2015520500 A | | 7/2015 |
| WO | 2013190294 A1 | | 12/2013 |

* cited by examiner

AIR-COOLED FUEL CELL SYSTEM

CROSS-REFERENCE TO RELATED APPLICATION

This application claims priority to Japanese Patent Application No. 2021-092784 filed on Jun. 2, 2021, which is incorporated herein by reference in its entirety.

TECHNICAL FIELD

The disclosure relates to an air-cooled fuel cell system.

BACKGROUND

A fuel cell (FC) is a power generation device which is composed of a single unit fuel cell (hereinafter, it may be referred to as "cell") or a fuel cell stack composed of stacked unit fuel cells (hereinafter, it may be referred to as "stack") and which generates electrical energy by electrochemical reaction between fuel gas (e.g., hydrogen) and oxidant gas (e.g., oxygen). In many cases, the fuel gas and oxidant gas actually supplied to the fuel cell, are mixtures with gases that do not contribute to oxidation and reduction. Especially, the oxidant gas is often air containing oxygen.

Hereinafter, fuel gas and oxidant gas may be collectively and simply referred to as "reaction gas" or "gas". Also, a single unit fuel cell and a fuel cell stack composed of stacked unit cells may be referred to as "fuel cell".

Various techniques relating to fuel cells mounted and used in fuel cell electric vehicles (hereinafter may be referred to as "vehicle") were proposed.

For example, Patent Literature 1 discloses a fuel cell stack assembly which includes a stack of fuel cells, each fuel cell having a cooling air conduit with an input/output ventilation aperture disposed on a ventilation face of the stack.

Patent Literature 2 discloses a fuel cell system which prevents channels from being blocked by condensed water while preventing a voltage drop to the utmost.

Patent Literature 3 discloses an automatic boiler quantity control system including blow operation.

Patent Literature 4 discloses an operating method of an on-vehicle fuel cell stack by which the temperature of an air-cooled fuel cell is rapidly increased up to an appropriate temperature for a power generation reaction.

Patent Literature 1: Japanese translation of PCT International Application No. 2015-520500
Patent Literature 2: Japanese Patent Application Laid-Open (JP-A) No. 2001-015136
Patent Literature 3: JP-A No. 1990-021102
Patent Literature 4: JP-A No. 2005-216783

In an air-cooled fuel cell, air is taken in from the outside through an air inlet and divided into reaction air and cooling air for use. Also in an air-cooled fuel cell, as in a water-cooled fuel cell, to increase the fuel cell temperature to an appropriate temperature for power generation, it is needed to circulate cooling air by use of heat that is generated during power generation of the fuel cell.

In Patent Literature 1, several cooling fans are needed. Accordingly, the weight of the assembly may increase; a special fan is needed to rotate the cooling fans backward; and in the case of stopping some of the cooling fans, local overheating may be caused by a decrease in flow rate. Also in Patent Literature 1, after the air is reacted, the reacted air is circulated in the fuel cell system. Accordingly, liquid water and water vapor contained in the reacted air are also circulated at the same time, and condensed water or a puddle is caused in the system. As a result, a decrease in the fuel cell performance and a deterioration of the fuel cell may occur.

It is also possible to accelerate the increase of the fuel cell temperature by decreasing the flow rate of the cooling air as in Patent Literature 4, instead of circulating the reacted air. However, due to low thermal conductivity of the air which is used as the refrigerant, local overheating may occur.

SUMMARY

The present disclosure was achieved in light of the above circumstances. An object of the present disclosure is to provide an air-cooled fuel cell system configured to efficiently warm up a fuel cell.

The air-cooled fuel cell system of the present disclosure is an air-cooled fuel cell system,
wherein the air-cooled fuel cell system comprises:
a fuel cell,
a reaction air supplier configured to supply reaction air to a reaction air inlet of the fuel cell,
a reaction air supply flow path configured to connect the reaction air supplier and the reaction air inlet of the fuel cell,
a reaction air discharge flow path configured to connect a reaction air outlet of the fuel cell and the outside of the air-cooled fuel cell system,
a housing,
a temperature acquirer configured to acquire a temperature of inside air discharged from a cooling air outlet, and
a controller;
wherein the fuel cell has a structure that a reaction air manifold and a cooling air manifold are independent of each other;
wherein the housing houses the fuel cell, the reaction air supplier, the reaction air supply flow path, the reaction air discharge flow path and the temperature acquirer;
wherein the housing includes a cooling air circulation flow path configured to connect the cooling air outlet of the fuel cell and a cooling air inlet of the fuel cell;
wherein the cooling air circulation flow path includes a cooling air driver disposed downstream from the cooling air outlet of the fuel cell and configured to supply cooling air to the cooling air inlet of the fuel cell;
wherein the housing includes an air inlet and an air outlet;
wherein a pressure loss unit is disposed at each of the air inlet and an inlet of the reaction air supply flow path;
wherein the air outlet includes an opening and closing unit; and
wherein, based on the temperature measured by the temperature acquirer, the controller controls opening and closing of the opening and closing unit and an opening degree thereof.

When it is determined that the inside air temperature measured by the temperature acquirer is less than a predetermined first temperature threshold, the controller may circulate the cooling air in the housing by controlling the opening degree of the opening and closing unit to less than a predetermined opening degree.

When it is determined that the inside air temperature measured by the temperature acquirer is the predetermined first temperature threshold or more and less than a predetermined second temperature threshold, the controller may circulate part of the cooling air in the housing by controlling the opening degree of the opening and closing unit to the predetermined opening degree.

When it is determined that the inside air temperature measured by the temperature acquirer is the predetermined second temperature threshold or more, the controller may discharge the cooling air to the outside of the housing by controlling the opening degree of the opening and closing unit to more than the predetermined opening degree.

The air-cooled fuel cell system may further comprise an outside temperature sensor.

When it is determined that an outside temperature is less than a predetermined first temperature threshold, the controller may circulate the cooling air in the housing by controlling the opening degree of the opening and closing unit to less than a predetermined opening degree.

When it is determined that the outside temperature is the predetermined first temperature threshold or more and less than a predetermined second temperature threshold, the controller may circulate part of the cooling air in the housing by controlling the opening degree of the opening and closing unit to the predetermined opening degree.

When it is determined that the outside temperature is the predetermined second temperature threshold or more, the controller may discharge the cooling air to the outside of the housing by controlling the opening degree of the opening and closing unit to more than the predetermined opening degree.

By the air-cooled fuel cell system of the present disclosure, the fuel cell is efficiently warmed up.

BRIEF DESCRIPTION OF THE DRAWINGS

In the accompanying drawings.

DETAILED DESCRIPTION

Figure 1:
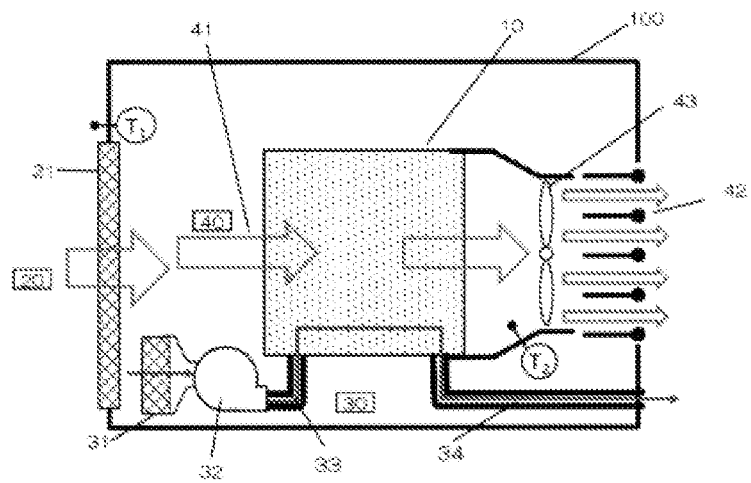
FIG. 1 is a schematic configuration diagram of an example of the air-cooled fuel cell system of the present disclosure, and it is also a diagram showing an example of a single-use mode.

The air-cooled fuel cell system of the present disclosure is an air-cooled fuel cell system,
wherein the air-cooled fuel cell system comprises:
a fuel cell,
a reaction air supplier configured to supply reaction air to a reaction air inlet of the fuel cell,
a reaction air supply flow path configured to connect the reaction air supplier and the reaction air inlet of the fuel cell,
a reaction air discharge flow path configured to connect a reaction air outlet of the fuel cell and the outside of the air-cooled fuel cell system,
a housing,
a temperature acquirer configured to acquire a temperature of inside air discharged from a cooling air outlet, and
a controller;
wherein the fuel cell has a structure that a reaction air manifold and a cooling air manifold are independent of each other;
wherein the housing houses the fuel cell, the reaction air supplier, the reaction air supply flow path, the reaction air discharge flow path and the temperature acquirer;
wherein the housing includes a cooling air circulation flow path configured to connect the cooling air outlet of the fuel cell and a cooling air inlet of the fuel cell;
wherein the cooling air circulation flow path includes a cooling air driver disposed downstream from the cooling air outlet of the fuel cell and configured to supply cooling air to the cooling air inlet of the fuel cell;
wherein the housing includes an air inlet and an air outlet;
wherein a pressure loss unit is disposed at each of the air inlet and an inlet of the reaction air supply flow path;
wherein the air outlet includes an opening and closing unit; and
wherein, based on the temperature measured by the temperature acquirer, the controller controls opening and closing of the opening and closing unit and an opening degree thereof.

The air-cooled fuel cell system of the present disclosure has the following structure: by circulating the cooling air inside a casing serving as the housing, the fuel cell and auxiliary components are wholly warmed up with preventing condensed water or the like. For circulation ratio control, a louver is disposed in the casing (the housing). In the case of a water-cooled fuel cell system having the same structure, it is difficult to achieve the practical use of the water-cooled fuel cell since water, which is used as the refrigerant, has electroconductivity, cause a short circuit in the fuel cell system.

By circulating the cooling air, the temperature of the whole of the inside of the casing of the air-cooled fuel cell system, is increased, and the outer surface of the fuel cell, the auxiliary components and so on are also warmed up. Also by the present disclosure, there is a reduced risk of freezing and clogging of auxiliary components, pipes (flow paths) and so on.

By not circulating the reaction air containing reacted liquid water or water vapor, the occurrence of condensed water, a puddle, a decrease in oxygen concentration and so on is suppressed. Also by the present disclosure, since there is no need for decreasing the flow rate of the cooling air, the risk of corrosion and a short circuit in internal electric circuits, cells and so on due to condensed water, a puddle or the like, is reduced.

Since the fuel cell is warmed up with relatively uniformizing the temperature of the inside of the fuel cell and without decreasing the flow rate of the cooling air, the occurrence of local overheating by variation in the cooling air flow rate due to water clogging of the refrigerant flow path, is reduced, and risks such as the deterioration of the fuel cell and a decrease in the power generation performance of the fuel cell due to a local puddle or the like which is caused by an increase in the temperature difference on the cell surface, is reduced. Accordingly, the power generation performance of the fuel cell is stabilized.

The fuel cell system of the present disclosure is the air-cooled fuel cell system.

The air-cooled fuel cell system uses air as the refrigerant. In the present disclosure, air used as the refrigerant may be referred to as "cooling air". Also in the present disclosure, air used as the oxidant gas may be referred to as "reaction air".

The air-cooled fuel cell system includes the fuel cell, the reaction air supplier, the reaction air supply flow path, the reaction air discharge flow path, the housing, the temperature acquirer, the controller and so on.

The fuel cell generally includes a unit fuel cell.

The fuel cell may be a fuel cell composed of a single unit fuel cell, or it may be a fuel cell stack composed of stacked unit fuel cells.

The number of the stacked unit fuel cells is not particularly limited. For example, 2 to several hundred unit fuel cells may be stacked; 20 to 600 unit fuel cells may be stacked; or 40 to 200 unit fuel cells may be stacked.

At both stacking-direction ends of each unit fuel cell, the fuel cell stack may include an end plate, a collector plate, a pressure plate and the like.

Each unit fuel cell may include a membrane electrode gas diffusion layer assembly (MEGA). Each unit fuel cell may include first and second separators sandwiching the membrane electrode gas diffusion layer assembly.

The membrane electrode gas diffusion layer assembly includes a first gas diffusion layer, a first catalyst layer, an electrolyte membrane, a second catalyst layer and a second gas diffusion layer in this order.

More specifically, the membrane electrode gas diffusion layer assembly includes an anode-side gas diffusion layer, an anode catalyst layer, an electrolyte membrane, a cathode catalyst layer and a cathode-side gas diffusion layer in this order.

One of the first and second catalyst layers is the cathode catalyst layer, and the other is the anode catalyst layer.

The cathode (oxidant electrode) includes the cathode catalyst layer and the cathode-side gas diffusion layer.

The anode (fuel electrode) includes the anode catalyst layer and the anode-side gas diffusion layer.

The first catalyst layer and the second catalyst layer are collectively referred to as "catalyst layer". The cathode catalyst layer and the anode catalyst layer are collectively referred to as "catalyst layer".

One of the first gas diffusion layer and the second gas diffusion layer is the cathode-side gas diffusion layer, and the other is the anode-side gas diffusion layer.

The first gas diffusion layer is the cathode-side gas diffusion layer when the first catalyst layer is the cathode catalyst layer. The first gas diffusion layer is the anode-side gas diffusion layer when the first catalyst layer is the anode catalyst layer.

The second gas diffusion layer is the cathode-side gas diffusion layer when the second catalyst layer is the cathode catalyst layer. The second gas diffusion layer is the anode-side gas diffusion layer when the second catalyst layer is the anode catalyst layer.

The first gas diffusion layer and the second gas diffusion layer are collectively referred to as "gas diffusion layer" or "diffusion layer". The cathode-side gas diffusion layer and the anode-side gas diffusion layer are collectively referred to as "gas diffusion layer" or "diffusion layer".

The gas diffusion layer may be a gas-permeable electroconductive member or the like.

As the electroconductive member, examples include, but are not limited to, a porous carbon material such as carbon cloth and carbon paper, and a porous metal material such as metal mesh and foam metal.

The fuel cell may include a microporous layer (MPL) between the catalyst layer and the gas diffusion layer. The microporous layer may contain a mixture of a water repellent resin such as PTFE and an electroconductive material such as carbon black.

The electrolyte membrane may be a solid polymer electrolyte membrane. As the solid polymer electrolyte membrane, examples include, but are not limited to, a hydrocarbon electrolyte membrane and a fluorine electrolyte membrane such as a thin, moisture-containing perfluorosulfonic acid membrane. The electrolyte membrane may be a Nafion membrane (manufactured by DuPont Co., Ltd.), for example.

One of the first separator and the second separator is the cathode-side separator, and the other is the anode-side separator.

The first separator is the cathode-side separator when the first catalyst layer is the cathode catalyst layer. The first separator is the anode-side separator when the first catalyst layer is the anode catalyst layer.

The second separator is the cathode-side separator when the second catalyst layer is the cathode catalyst layer. The second separator is the anode-side separator when the second catalyst layer is the anode catalyst layer.

The first separator and the second separator are collectively referred to as "separator". The anode-side separator and the cathode-side separator are collectively referred to as "separator".

The membrane electrode gas diffusion layer assembly is sandwiched by the first separator and the second separator.

The separator may include supply and discharge holes for allowing the fluid such as the reaction gas and the refrigerant to flow in the stacking direction of the unit fuel cells. When the refrigerant is gas, for example, cooling air may be used as the refrigerant.

As the supply hole, examples include, but are not limited to, a fuel gas supply hole, an oxidant gas supply hole, and a refrigerant supply hole.

As the discharge hole, examples include, but are not limited to, a fuel gas discharge hole, an oxidant gas discharge hole, and a refrigerant discharge hole.

The separator may include one or more fuel gas supply holes, one or more oxidant gas supply holes, one or more refrigerant supply holes as needed, one or more fuel gas discharge holes, one or more oxidant gas discharge holes, and one or more refrigerant discharge holes as needed.

The separator may include a reaction gas flow path on a surface in contact with the gas diffusion layer. Also, the separator may include a refrigerant flow path for keeping the fuel cell temperature constant, on the surface opposite to the surface in contact with the gas diffusion layer.

When the separator is the anode-side separator, it may include one or more fuel gas supply holes, one or more oxidant gas supply holes, one or more refrigerant supply holes as needed, one or more fuel gas discharge holes, one or more oxidant gas discharge holes, and one or more refrigerant discharge holes as needed. The anode-side separator may include a fuel gas flow path for allowing the fuel gas to flow from the fuel gas supply hole to the fuel gas discharge hole, on the surface in contact with the anode-side gas diffusion layer. As needed, the anode-side separator may include a refrigerant flow path for allowing the refrigerant to from the refrigerant supply hole to the refrigerant discharge hole, on the surface opposite to the surface in contact with the anode-side gas diffusion layer.

When the separator is the cathode-side separator, it may include one or more fuel gas supply holes, one or more oxidant gas supply holes, one or more refrigerant supply holes as needed, one or more fuel gas discharge holes, one or more oxidant gas discharge holes, and one or more refrigerant discharge holes as needed. The cathode-side separator may include an oxidant gas flow path for allowing the oxidant gas to flow from the oxidant gas supply hole to the oxidant gas discharge hole, on the surface in contact with the cathode-side gas diffusion layer. As needed, the cathode-side separator may include a refrigerant flow path for allowing the refrigerant to flow from the refrigerant supply hole to the refrigerant discharge hole, on the surface opposite to the surface in contact with the cathode-side gas diffusion layer.

The separator may be a gas-impermeable electroconductive member or the like. As the electroconductive member, examples include, but are not limited to, a resin material such as thermosetting resin, thermoplastic resin and resin fiber, a carbon composite material obtained by press-molding a mixture containing a carbonaceous material such as carbon powder and carbon fiber, gas-impermeable dense carbon obtained by carbon densification, and a metal plate (such as a titanium plate, an iron plate, an aluminum plate and a stainless-steel (SUS) plate) obtained by press-molding. The separator may function as a collector.

The shape of the separator may be a rectangular shape, a horizontal hexagon shape, a horizontal octagon shape, a circular shape or a long circular shape, for example.

The fuel cell may include a manifold such as an inlet manifold communicating between the supply holes and an outlet manifold communicating between the discharge holes.

As the inlet manifold, examples include, but are not limited to, an anode inlet manifold, a reaction air inlet manifold (a cathode inlet manifold) and a cooling air inlet manifold.

As the outlet manifold, examples include, but are not limited to, an anode outlet manifold, a reaction air outlet manifold (a cathode outlet manifold) and a cooling air outlet manifold.

In the present disclosure, the reaction air inlet manifold (the cathode inlet manifold) and the reaction air outlet manifold (the cathode outlet manifold) are collectively referred to as "reaction air manifold".

Also in the present disclosure, the cooling air inlet manifold and the cooling air outlet manifold are collectively referred to as "cooling air manifold".

The fuel cell has the structure that the reaction air manifold and the cooling air manifold are independent of each other.

In the present disclosure, the fuel gas and the oxidant gas are collectively referred to as "reaction gas". The reaction gas supplied to the anode is the fuel gas, and the reaction gas supplied to the cathode is the oxidant gas. The fuel gas is a gas mainly containing hydrogen, and it may be hydrogen. The oxidant gas may be oxygen, air, dry air or the like.

The fuel cell may include a resin frame.

The resin frame may be disposed in the periphery of the membrane electrode gas diffusion layer assembly and may be disposed between the first separator and the second separator.

The resin frame may be a component for preventing cross leakage or a short circuit between the catalyst layers of the membrane electrode gas diffusion layer assembly.

The resin frame may include a skeleton, an opening, supply holes and discharge holes.

The skeleton is a main part of the resin frame, and it connects to the membrane electrode gas diffusion layer assembly.

The opening is a region retaining the membrane electrode gas diffusion layer assembly, and it is also a through-hole penetrating a part of the skeleton to set the membrane electrode gas diffusion layer assembly therein. In the resin frame, the opening may be disposed in the position where the skeleton is disposed around (in the periphery) of the membrane electrode gas diffusion layer assembly, or it may be disposed in the center of the resin frame.

The supply and discharge holes allows the reaction gas, the refrigerant and the like to flow in the stacking direction of the unit fuel cells. The supply holes of the resin frame may be aligned and disposed to communicate with the supply holes of the separator. The discharge holes of the resin frame may be aligned and disposed to communicate with the discharge holes of the separator.

The resin frame may include a frame-shaped core layer and two frame-shaped shell layers disposed on both surfaces of the core layer, that is, a first shell layer and a second shell layer.

Like the core layer, the first shell layer and the second shell layer may be disposed in a frame shape on both surfaces of the core layer.

The core layer may be a structural member which has gas sealing properties and insulating properties. The core layer may be formed of a material such that the structure is unchanged at the temperature of hot pressing in a fuel cell production process. As the material for the core layer, examples include, but are not limited to, resins such as polyethylene, polypropylene, polycarbonate (PC), polyphenylene sulfide (PPS), polyethylene terephthalate (PET), polyethylene naphthalate (PEN), polyamide (PA), polyimide (PI), polystyrene (PS), polyphenylene ether (PPE), polyether ether ketone (PEEK), cycloolefin, polyethersulfone (PES), polyphenylsulfone (PPSU), liquid crystal polymer (LCP) and epoxy resin. The material for the core layer may be a rubber material such as ethylene propylene diene rubber (EPDM), fluorine-based rubber and silicon-based rubber.

From the viewpoint of ensuring insulating properties, the thickness of the core layer may be 5 μm or more, or it may be 30 μm or more. From the viewpoint of reducing the cell thickness, the thickness of the core layer may be 200 μm or less, or it may be 150 μm or less.

To attach the core layer to the anode-side and cathode-side separators and to ensure sealing properties, the first shell layer and the second shell layer may have the following properties: the first and second shell layers have high adhesion to other substances; they are softened at the temperature of hot pressing; and they have lower viscosity and lower melting point than the core layer. More specifically, the first shell layer and the second shell layer may be thermoplastic resin such as polyester-based resin and modified olefin-based resin, or they may be thermosetting resin such as modified epoxy resin. The first shell layer and the second shell layer may be the same kind of resin as the adhesive layer.

The resin for forming the first shell layer and the resin for forming the second shell layer may be the same kind of resin, or they may be different kinds of resins. By disposing the shell layers on both surfaces of the core layer, it becomes easy to attach the resin frame and the two separators by hot pressing.

From the viewpoint of ensuring adhesion, the thickness of the first and second shell layers may be 5 μm or more, or it may be 20 μm or more. From the viewpoint of reducing the cell thickness, the thickness of the first and second shell layers may be 100 μm or less, or it may be 40 μm or less.

In the resin frame, the first shell layer may be disposed only at a part that is attached to the anode-side separator, and the second shell layer may be disposed only at a part attached to the cathode-side separator. The first shell layer disposed on one surface of the core layer may be attached to the cathode-side separator. The second shell layer disposed on the other surface of the core layer may be attached to the anode-side separator. The resin frame may be sandwiched by the pair of separators.

The fuel cell may include a gasket between the adjacent unit fuel cells.

The material for the gasket may be ethylene propylene diene monomer (EPDM) rubber, silicon rubber, thermoplastic elastomer resin or the like.

The fuel cell may include a cooling plate between the adjacent unit fuel cells.

The cooling plate is a corrugated plate including concave grooves configured to function as a refrigerant flow path.

As the cooling plate, for example, a corrugated metal plate obtained by folding a metal plate (such as an aluminum plate) may be used. The surface of the cooling plate may be subjected to conductive treatment with silver, nickel, carbon or the like.

The concave grooves of the cooling plate may be formed by folding the cooling plate.

The depth of the concave grooves may be from 1.0 mm to 2.0 mm, for example.

The metal plate may be folded to form concave grooves with a depth of from 1.0 mm to 2.0 mm at a pitch of from 1.0 mm to 2.0 mm, for example, thereby preparing the corrugated cooling plate.

As long as the cooling plate is disposed between the adjacent unit fuel cells, the cooling plate may be disposed in at least a part of the region in the planar direction between the adjacent unit fuel cells.

The cooling plate may be disposed in the region which is between the unit fuel cells adjacent to each other in the planar direction and which faces at least the MEGA.

The cooling plate may be disposed in a region which is other than the region where the gasket is disposed between the unit fuel cells adjacent to each other in the planar direction.

The cooling plate may include a protrusion protruding from the unit fuel cell.

The shape of the cooling plate may be a rectangular shape, a horizontal hexagon shape, a horizontal octagon shape, a circular shape or a long circular shape, for example.

The housing houses the fuel cell, the reaction air supplier, the reaction air supply flow path, the reaction air discharge flow path and the temperature acquirer. The housing may be a casing, for example. The material for the housing is not particularly limited, and it may be a metal, a resin or a carbonaceous material, for example.

The housing includes the cooling system of the fuel cell. The housing includes the cooling air circulation flow path as the cooling system of the fuel cell. The cooling air circulation flow path may be a region which is inside the housing and in which components such as the fuel cell, the oxidant gas system, the fuel gas system and the auxiliary components are not disposed. As the auxiliary components, examples include, but are not limited to, an ECU, a converter and an air compressor.

The cooling air circulation flow path connects the cooling air outlet of the fuel cell and the cooling air inlet of the fuel cell. The cooling air inlet may be a refrigerant supply hole, a cooling air inlet manifold, or the like. The cooling air outlet may be a refrigerant discharge hole, a cooling air outlet manifold, or the like.

The cooling air circulation flow path includes the cooling air driver.

The cooling air driver is disposed downstream from the cooling air outlet of the fuel cell and supplies the cooling air to the cooling air inlet of the fuel cell.

The cooling air driver is electrically connected to the controller. The cooling air driver is operated according to a control signal from the controller. The flow rate of the refrigerant supplied from the cooling air driver to the fuel cell is controlled by the controller. The temperature of the fuel cell may be controlled thereby.

As the cooling air driver, examples include, but are not limited to, an air pump, an air compressor, an air blower and an air fan.

In the fuel cell, by disposing the cooling air driver on the cooling air outlet side, the pressure inside the cooling air manifold of the fuel cell is controlled to atmospheric pressure or less.

The structure of the cooling system is an atmospheric release structure having no valve, and the pressure of the cooling air is equal to the outside pressure (e.g., $-0.01$ kPaG to $-0.3$ kPaG). Accordingly, the fuel cell structure is prevented from being exposed to stress associated with pressure difference, and the use of a lightweight, inexpensive housing material is allowed.

The housing includes the air inlet and the air outlet.

The air inlet takes in air from the outside of the air-cooled fuel cell system.

The air outlet discharges air to the outside of the air-cooled fuel cell system.

The air outlet includes the opening and closing unit.

As the opening and closing unit, examples include, but are not limited to, a movable louver and a movable shutter.

Since the opening and closing unit is disposed, the circulation mode and single-mode of the cooling air is allowed to be selected and controlled by opening and closing the opening and closing unit.

The opening and closing unit is electrically connected to the controller. The opening and closing of the opening and closing unit and the opening degree thereof are controlled according to a control signal from the controller. The circulation flow rate and discharge flow rate of the cooling air may be controlled thereby.

The pressure loss unit is disposed at each of the air inlet and the inlet of the reaction air supply flow path. As the pressure loss unit, examples include, but are not limited to, a filter. By disposing the pressure loss unit at the air inlet, warmed air is kept in the housing. In addition, by disposing the pressure loss unit at the air inlet, the efficiency of air circulation in the housing is increased. By disposing the pressure loss unit at the inlet of the reaction air supply flow path, contamination of the oxidant gas system by impurities, is suppressed.

The housing may include an air divider. The air divider divides the air taken in from the air inlet into the reaction air and the cooling air before the air is introduced to the fuel cell. The air divider is not always necessary when the reaction air inlet configured to take in the reaction air from the outside and the cooling air inlet configured to take in the cooling air from the outside are disposed as the air inlet.

The aid divider may divide the air into the reaction air and the cooling air at a flow rate ratio of from 1:20 to 1:50.

The fuel cell system includes an oxidant gas system (a reaction air system).

The oxidant gas system may include the reaction air supplier, the reaction air supply flow path, the reaction air discharge flow path, a reaction air bypass flow path, a bypass valve, a reaction air flow rate sensor and so on. More specifically, the reaction air supply flow path, the reaction air discharge flow path and/or the reaction air bypass flow path may be a pipe.

The reaction air supplier supplies the reaction air to the fuel cell. More specifically, the reaction air supplier supplies the reaction air to the cathode of the fuel cell.

The sealed volume of the oxidant gas system may be 5 times or less the sealed volume of the fuel gas system.

The reaction air supplier supplies the reaction air to the reaction air inlet of the fuel cell.

As the reaction air supplier, examples include, but are not limited to, an air pump, an air compressor, an air blower and an air fan.

In the oxidant gas system, the reaction air supplier is independently disposed before the introduction of the reaction air into the fuel cell. By independently disposing the cooling air driver and the reaction air supplier in the cooling system and the oxidant gas system, respectively, the flow rate of the cooling air and that of the reaction air is independently controlled; the water discharge properties and the humidity is precisely controlled; and the power generation performance of the fuel cell is increased.

The reaction air supplier is electrically connected to the controller. The reaction air supplier is operated according to a control signal from the controller. At least one selected from the group consisting of the flow rate and pressure of the reaction air supplied from the reaction air supplier to the cathode, may be controlled by the controller.

The reaction air supply flow path connects the reaction air supplier and the reaction air inlet of the fuel cell. The reaction air supply flow path allows the reaction air to be supplied from the reaction air supplier to the cathode of the fuel cell. The reaction air inlet may be the oxidant gas supply hole, the cathode inlet manifold, or the like. The reaction air supply flow path may branch from the air divider. The reaction air supply flow path may branch from the cooling air circulation flow path.

The reaction air supply flow path may include the first valve in the region downstream of the reaction air supplier and upstream of the reaction air inlet of the fuel cell.

The first valve may be directly disposed at the reaction air inlet of the fuel cell.

The first valve may be disposed upstream of the reaction air supplier.

The first valve is electrically controlled to the controller. By opening the first valve by the controller, the reaction air is supplied from the reaction air supply flow path to the reaction air inlet of the fuel cell.

The pressure loss unit is disposed at the inlet of the reaction air supply flow path. The pressure loss unit may be disposed upstream of the reaction air supplier of the reaction air supply flow path. As the pressure loss unit, examples include, but are not limited to, a filter. As the pressure loss unit disposed in the reaction air supply flow path, for example, a filter which is finer and higher in pressure loss than the pressure loss unit disposed in the air inlet, may be used. By cleaning the whole of the air introduction system, the energy loss of the fuel cell increases. However, by cleaning only the oxidant gas system, the energy loss of the fuel cell is suppressed. By virtue of the use of the finer filter, the contamination of the cooling air is reduced, and the durability of the fuel cell is increased.

The reaction air discharge flow path connects the reaction air outlet of the fuel cell and the outside of the air-cooled fuel cell system. The reaction air discharge flow path allows the reaction air, which is discharged from the cathode of the fuel cell, to be discharged to the outside of the air-cooled fuel cell system. The reaction air outlet may be the oxidant gas discharge hole, the cathode outlet manifold, or the like.

The reaction air discharge flow path may include a second valve downstream of the reaction air outlet of the fuel cell. The second valve may be a sealing valve or an oxidant gas pressure control valve.

The second valve is electrically connected to the controller. By opening the second valve by the controller, the reaction air is discharged to the outside from the reaction air discharge flow path. The pressure of the reaction air supplied to the cathode (cathode pressure) may be controlled by controlling the opening degree of the second valve.

The reaction air bypass flow path branches from the reaction air supply flow path, bypasses the fuel cell, and connects the branch of the reaction air supply flow path and the junction of the reaction air discharge flow path.

The bypass valve is disposed in the reaction air bypass flow path.

The bypass valve is electrically connected to the controller. By opening the bypass valve by the controller, when the supply of the reaction air to the fuel cell is unnecessary, the reaction air is allowed to bypass the fuel cell and be discharged to the outside from the reaction air discharge flow path.

The reaction air flow rate sensor may be disposed in the reaction air supply flow path.

The reaction air flow rate sensor detects the flow rate of the reaction air in the oxidant gas system. The reaction air flow rate sensor is electrically connected to the controller. The controller may estimate the rotational speed of the air compressor from the flow rate of the reaction air detected by the reaction air flow rate sensor. The reaction air flow rate sensor may be disposed upstream from the reaction air supplier of the reaction air supply flow path.

As the reaction air flow rate sensor, a conventionally-known flow meter or the like may be used.

For the oxidant gas system, by the reaction air supplier and the second valve, the pressure inside the reaction air manifold of the fuel cell can be a pressure that is equal to or more than atmospheric pressure (e.g., 5 kPaG to 15 kPaG).

The pressure of the reaction air is increased by the second valve of the oxidant gas system. Accordingly, the fuel cell performance is increased by increased oxygen partial pressure and prevention of drying of the fuel cell.

When the oxidant gas system and the cooling system are not separated, it is also necessary to increase the pressure of the cooling air which is at a flow rate that is approximately 30 times the flow rate of the reaction air. As a result, the energy loss which is produced when the oxidant gas system and the cooling system are not separated, is 30 or more times larger than the energy loss which is produced when the oxidant gas system and the cooling system are separated.

The fuel cell system includes a fuel gas system.

The fuel gas system supplies fuel gas to the fuel cell.

The fuel gas system includes a fuel gas supplier.

The fuel gas supplier supplies the fuel gas to the anode of the fuel cell.

As the fuel gas supplier, examples include, but are not limited to, a fuel tank such as a liquid hydrogen tank and a compressed hydrogen tank.

The fuel gas supplier is electrically connected to the controller. In the fuel gas supplier, ON/OFF of the fuel gas supply to the fuel cell may be controlled by controlling the opening and closing of the main shutoff valve of the fuel gas supplier according to a control signal from the controller.

The fuel gas system includes a fuel gas supply flow path. More specifically, the fuel gas supply flow path may be a pipe.

The fuel gas supply flow path connects the fuel gas supplier and the fuel gas inlet of the fuel cell. The fuel gas supply flow path allows the fuel gas to be supplied to the anode of the fuel cell. The fuel gas inlet may be the fuel gas supply hole, the anode inlet manifold, or the like.

The fuel gas supply flow path comprises a third valve upstream of the fuel gas inlet of the fuel cell.

The third valve may be directly disposed at the fuel gas inlet of the fuel cell.

The third valve may be disposed upstream of an ejector.

The third valve is electrically connected to the controller. By opening the third valve by the controller, the fuel gas is supplied from the fuel gas supply flow path to the fuel gas inlet of the fuel cell.

In the fuel gas supply flow path, an ejector may be disposed.

For example, the ejector may be disposed at a junction with a circulation flow path on the fuel gas supply flow path. The ejector supplies a mixed gas containing fuel gas and circulation gas to the anode of the fuel cell. As the ejector, a conventionally-known ejector may be used.

A pressure control valve and a medium-pressure hydrogen sensor may be disposed in a region between the fuel gas supplier and ejector of the fuel gas supply flow path.

The pressure control valve controls the pressure of the fuel gas supplied from the fuel gas supplier to the ejector.

The pressure control valve is electrically connected to the controller. The pressure of the fuel gas supplied to the ejector may be controlled by controlling the opening/closing, opening degree or the like of the pressure control valve by the controller.

The medium-pressure hydrogen sensor is electrically connected to the controller. The controller detects the fuel gas pressure measured by the medium-pressure hydrogen sensor. The pressure of the fuel gas supplied to the ejector may be controlled by controlling the opening/closing, opening degree or the like of the pressure control valve, based on the detected pressure.

The fuel gas system includes a fuel off-gas discharge flow path. More specifically, the fuel off-gas discharge flow path may be a pipe.

The fuel off-gas discharge flow path connects the fuel gas outlet of the fuel cell and the outside of the fuel cell system.

In the fuel off-gas discharge flow path, a gas-liquid separator may be disposed in a region between the fuel gas outlet and the outside of the fuel cell system.

The fuel off-gas discharge flow path may branch from the circulation flow path through the gas-liquid separator.

The fuel off-gas discharge flow path discharges, to the outside of the fuel cell system, the fuel off-gas discharged from the fuel gas outlet of the fuel cell. The fuel gas outlet may be the fuel gas discharge hole, the anode outlet manifold, or the like.

The fuel off-gas discharge flow path may include a fourth valve (a fuel off-gas discharge valve or a gas and water discharge valve) downstream of the fuel gas outlet of the fuel cell.

The fourth valve may be directly disposed at the fuel gas outlet of the fuel cell.

The fourth valve may be disposed downstream from the gas-liquid separator in the fuel off-gas discharge flow path.

The fourth valve allows the fuel off-gas, water and the like to be discharged to the outside (of the system). The outside may be the outside of the fuel cell system, or it may be the outside of the vehicle.

The fourth valve may be electrically connected to the controller, and the flow rate of the fuel off-gas discharged to the outside and the flow rate of the discharged water (liquid water) may be controlled by controlling the opening and closing of the fourth valve by the controller. By controlling the opening degree of the fourth valve, the pressure of the fuel gas supplied to the anode of the fuel cell (anode pressure) may be controlled.

The fuel off-gas may contain the fuel gas that has passed through the anode without reacting, and the water generated at the cathode and delivered to the anode. In some cases, the fuel off-gas contains corroded substances generated in the catalyst layer, the electrolyte membrane or the like, and the oxidant gas or the like allowed to be supplied to the anode during a purge.

The fuel gas system may include the circulation flow path. More specifically, the circulation flow path may be a pipe.

The circulation flow path may connect the fuel gas outlet of the fuel cell and the ejector.

The circulation flow path may branch from the fuel off-gas discharge flow path and connect to the ejector disposed in the fuel gas supply flow path, thereby merging with the fuel gas supply flow path.

The circulation flow path may branch from the fuel off-gas discharge flow path through the gas-liquid separator and connect to the ejector disposed in the fuel gas supply flow path, thereby merging with the fuel gas supply flow path.

The circulation flow path allows the fuel off-gas, which is the fuel gas discharged from the fuel gas outlet of the fuel cell, to be recovered and supplied to the fuel cell as the circulation gas.

A gas circulation pump may be disposed in the circulation flow path. The gas circulation pump circulates the fuel off-gas as the circulation gas. The gas circulation pump may be electrically connected to the controller, and the flow rate of the circulation gas may be controlled by controlling ON/OFF, rotational speed, etc., of the gas circulation pump by the controller.

The gas-liquid separator (anode gas-liquid separator) may be disposed in the circulation flow path.

The gas-liquid separator may be disposed at the branch point of the fuel off-gas discharge flow path and the circulation flow path. Accordingly, the flow path from the fuel gas outlet to the gas-liquid separator may be the fuel off-gas discharge flow path or the circulation flow path.

The gas-liquid separator is disposed upstream from the fourth valve of the fuel off-gas discharge flow path.

The gas-liquid separator separates the water (liquid water) and the fuel off-gas which is the fuel gas discharged from the fuel gas outlet. Accordingly, the fuel off-gas may be returned to the circulation flow path as the circulation gas, or unnecessary gas, water and the like may be discharged to the outside by opening the gas and water discharge valve of the fuel off-gas discharge flow path. In addition, by the gas-liquid separator, the flow of excess water into the circulation flow path is suppressed. Accordingly, the occurrence of freezing of the circulation pump or the like due to the water, is suppressed.

The temperature acquirer acquires the temperature of the air of the inside of the housing, which is discharged from the cooling air outlet of the fuel cell.

The temperature acquirer is electrically connected to the controller. The controller detects the temperature of the air inside the housing, which is measured by the temperature acquirer.

As the temperature acquirer, a conventionally-known temperature sensor, a thermometer or the like may be used.

The fuel cell system may include a secondary cell.

The secondary cell (battery) may be any chargeable and dischargeable battery. For example, it may be a conventionally-known secondary cell such as a nickel-hydrogen secondary cell and a lithium ion secondary cell. The secondary cell may include a power storage element such as an electric double layer capacitor. The secondary cell may have a structure such that a plurality of secondary cells are connected in series. The secondary cell supplies power to a motor, an air compressor and the like. The secondary cell may be chargeable by a power source outside the vehicle. The secondary cell may be charged by the output power of the fuel cell. The charge and discharge of the secondary cell may be controlled by the controller.

The controller physically includes a processing unit such as a central processing unit (CPU), a memory device such as a read-only memory (ROM) and a random access memory (RAM), and an input-output interface. The ROM is used to store a control program, control data and so on to be processed by the CPU, and the RAM is mainly used as various workspaces for control processing. The controller may be a control device such as an electronic control unit (ECU).

The controller may be electrically connected to an ignition switch which may be mounted in the vehicle. The controller may be operable by an external power source even if the ignition switch is turned OFF.

The controller monitors the temperature measured by the temperature acquirer. During the operation of the fuel cell, the controller may monitor the temperature measured by the temperature acquirer.

Based on the temperature measured by the temperature acquirer, the controller controls the opening and closing of the opening and closing unit and the opening degree thereof.

Based on the temperature measured by the temperature acquirer and the fuel cell operation state, it is determined whether or not it is needed to increase the fuel cell temperature. In the case of increasing the fuel cell temperature, by closing the opening and closing unit such as a louver, the cooling air is circulated in the housing for warm-up operation of the fuel cell.

Also, the intermediate mode is a mode in which, even in the steady operation of the fuel cell, the fuel cell is shifted into the circulation mode in which some outside air is taken in by partly opening the opening and closing unit such as a louver, thereby operating the fuel cell at a desired temperature.

When it is determined that the inside air temperature measured by the temperature acquirer is less than the predetermined first temperature threshold, the controller may circulate the cooling air in the housing by controlling the opening degree of the opening and closing unit to less than the predetermined opening degree. The predetermined opening degree may be such that the opening degree of the opening and closing unit is 0% or more and less than 5%, for example.

When it is determined that the inside air temperature measured by the temperature acquirer is the predetermined first temperature threshold or more and less than the predetermined second temperature threshold, the controller may circulate part of the cooling air in the housing by controlling the opening degree of the opening and closing unit to the predetermined opening degree. The predetermined opening degree may be such that the opening degree of the opening and closing unit is 5% or more and 90% or less, for example.

When it is determined that the inside air temperature measured by the temperature acquirer is the predetermined second temperature threshold or more, the controller may discharge the cooling air to the outside of the housing by controlling the opening degree of the opening and closing unit to more than the predetermined opening degree. The predetermined opening degree may be such that the opening degree of the opening and closing unit is more than 90% and 100% or less, for example.

The controller may execute the circulation mode when the inside air temperature is lower than the appropriate temperature. When the inside air temperature is within the appropriate temperature range, the controller may execute the intermediate mode. When the inside air temperature is higher than the appropriate temperature range, the controller may execute the single-use mode.

As needed, the predetermined first and second temperature thresholds may be varied depending on the power generation state and performance of the fuel cell.

The first temperature threshold may be 0° C. or more, 10° C. or more, 20° C. or more, 30° C. or more, or 40° C. or more, for example.

The second temperature threshold may be 80° C. or less, 70° C. or less, 60° C. or less, 50° C. or less, or 40° C. or less, for example.

The air-cooled fuel cell system may include the outside temperature sensor.

The outside temperature sensor acquires the outside temperature.

The outside temperature sensor is electrically connected to the controller. The controller detects the outside temperature measured by the outside temperature sensor.

As the outside temperature sensor, a conventionally-known temperature sensor, a thermometer or the like may be used.

As long as the outside temperature can be measured, the outside temperature sensor may be disposed outside the housing, or it may be disposed inside the housing.

When it is determined that the outside temperature is less than the predetermined first temperature threshold, the controller may circulate the cooling air in the housing by controlling the opening degree of the opening and closing unit to less than the predetermined opening degree. The predetermined opening degree may be such that the opening degree of the opening and closing unit is 0% or more and less than 5%, for example.

When it is determined that the outside temperature is the predetermined first temperature threshold or more and less than the predetermined second temperature threshold, the controller may circulate part of the cooling air in the housing by controlling the opening degree of the opening and closing unit to the predetermined opening degree. The predetermined opening degree may be such that the opening degree of the opening and closing unit is 5% or more and 90% or less, for example.

When it is determined that the outside temperature is the predetermined second temperature threshold or more, the controller may discharge the cooling air to the outside of the housing by controlling the opening degree of the opening and closing unit to more than the predetermined opening degree. The predetermined opening degree may be such that the opening degree of the opening and closing unit is more than 90% and 100% or less, for example.

As needed, the predetermined first and second temperature thresholds may be varied depending on the power generation state and performance of the fuel cell.

The controller may execute the circulation mode when the outside temperature is lower than a reference value. When the outside temperature is within a reference value range, the controller may execute the intermediate mode. When the outside temperature is higher than the reference value, the controller may execute the single-use mode.

The first temperature threshold may be −20° C. or less, −10° C. or less, or 0° C. or less, for example.

The second temperature threshold may be 10° C. or more, 20° C. or more, or 30° C. or more, for example.

When the optimal fuel cell operation condition is such that the temperature of the cooling air inlet is 30° C. and the temperature of the cooling air outlet is 60° C., based on the amount of heat generated at the operating point of the fuel cell, the rotational frequency of a fan (the cooling air driver) may be set to the flow rate at which the temperature difference ΔT between the inside air temperature and the outside temperature is 30° C.

When the outside temperature T1 is 30° C., the fuel cell may be operated in the single-use mode in which the cooling air is not circulated.

When the outside temperature T1 is 0° C., at the time of stating the fuel cell, the operation of the fuel cell may be started in the circulation mode by closing the louver (the opening and closing unit).

When the temperature in the housing is gradually increased and the inside air temperature T2 is increased from 0° C. to 60° C., the fuel cell may be shifted into the intermediate mode by partly opening the louver.

When the flow rate ratio of the outside air to the internally circulating air is set to 1:1, the outside air (0° C.) and the circulating air (60° C.) are mixed at 1:1. Accordingly, the temperature of the cooling air inlet of the fuel cell goes to 30° C., and the temperature of the cooling air outlet of the fuel cell goes to 60° C. As a result, the desired operation environment is obtained.

When the flow rate of the cooling air is cut in half without circulation, the temperature of the cooling air outlet can be 60° C.; however, the temperature of the cooling air inlet side of the fuel cell is 0° C. Accordingly, the temperature difference on the cell surface is large; a puddle is formed in a cold part and causes a variance in air flow rate; and the fuel cell operation is likely to be instable, accordingly. From the viewpoint of increasing the circulation efficiency, some of the auxiliary components may be isolated from the cooling system so that they are not warmed up.

FIG. 1 is a schematic configuration diagram of an example of the air-cooled fuel cell system of the present disclosure, and it is also a diagram showing an example of a single-use mode. In FIG. 1, the fuel gas system and the auxiliary components are not shown for simplicity.

The air-cooled fuel cell system shown in FIG. 1 includes a housing 100. The housing 100 includes a fuel cell 10, an air system 20, an oxidant gas system 30, a cooling system 40, a controller 60, an outside temperature sensor T1 and a temperature acquirer T2.

The air system 20 includes the oxidant gas system 30 and the cooling system 40.

The housing 100 includes an air inlet 21 equipped with a filter.

The air inlet 21 takes in air, and the air is divided into the oxidant gas system 30 and the cooling system 40.

The oxidant gas system 30 includes a filter 31, a reaction air supplier 32, a reaction air supply flow path 33 and a reaction air discharge flow path 34.

Along the direction of air flow, the filter 31 and the reaction air supplier 32 are disposed in the reaction air supply flow path 33.

The cooling system 40 includes a cooling air circulation flow path 41, an opening and closing unit 42 and a cooling air driver 43. The opening and closing unit 42 is disposed at the air outlet of the housing 100.

The outside temperature sensor T1 acquires the outside temperature. A controller (not shown) detects the outside temperature acquired by the outside temperature sensor T1.

The temperature acquirer T2 acquires the temperature of the inside air discharged from the cooling air outlet of the fuel cell 10. The controller (not shown) detects the temperature acquired by the temperature acquirer T2.

In the single-use mode, the opening and closing unit 42 is fully opened to discharge the cooling air to the outside.

Figure 2:
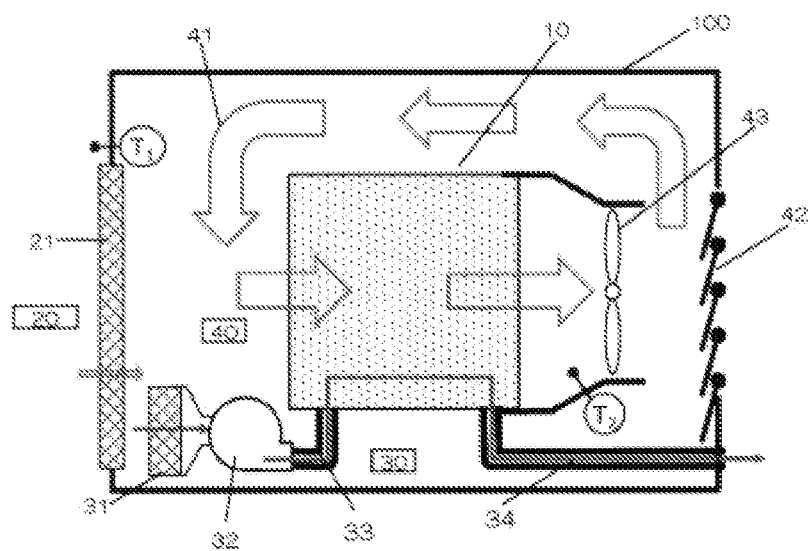
FIG. 2 is a schematic configuration diagram of another example of the air-cooled fuel cell system of the present disclosure, and it is also a diagram showing an example of a circulation mode.

FIG. 2 is a schematic configuration diagram of another example of the air-cooled fuel cell system of the present disclosure, and it is also a diagram showing an example of a circulation mode. Of the components shown in FIG. 2, the same components as FIG. 1 are allotted with the same numbers as FIG. 1 and will not be described here for simplicity.

In the circulation mode shown in FIG. 2, the opening and closing unit 42 is completely closed to circulate the cooling air inside the housing 100.

Figure 3:
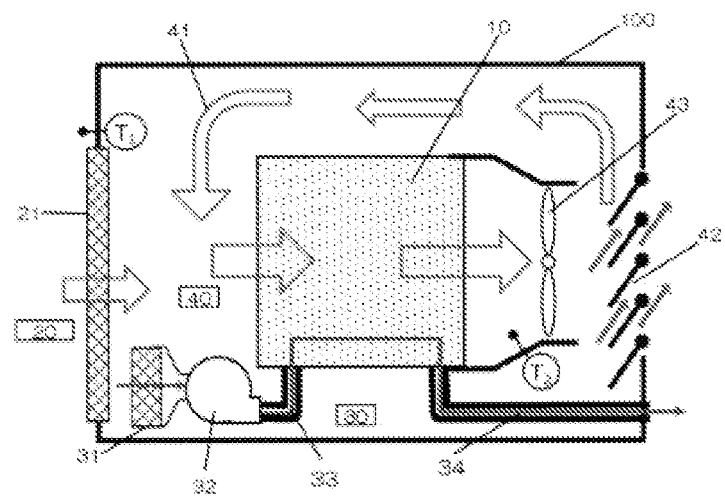
FIG. 3 is a schematic configuration diagram of another example of the air-cooled fuel cell system of the present disclosure, and it is also a diagram showing an example of an intermediate mode.

FIG. 3 is a schematic configuration diagram of another example of the air-cooled fuel cell system of the present disclosure, and it is also a diagram showing an example of an intermediate mode. Of the components shown in FIG. 3, the same components as FIG. 1 are allotted with the same numbers as FIG. 1 and will not be described here for simplicity.

In the intermediate mode shown in FIG. 3, the opening and closing unit 42 is partly closed to circulate part of the cooling air inside the housing 100 and discharge the rest of the cooling air to the outside.

Figure 4:
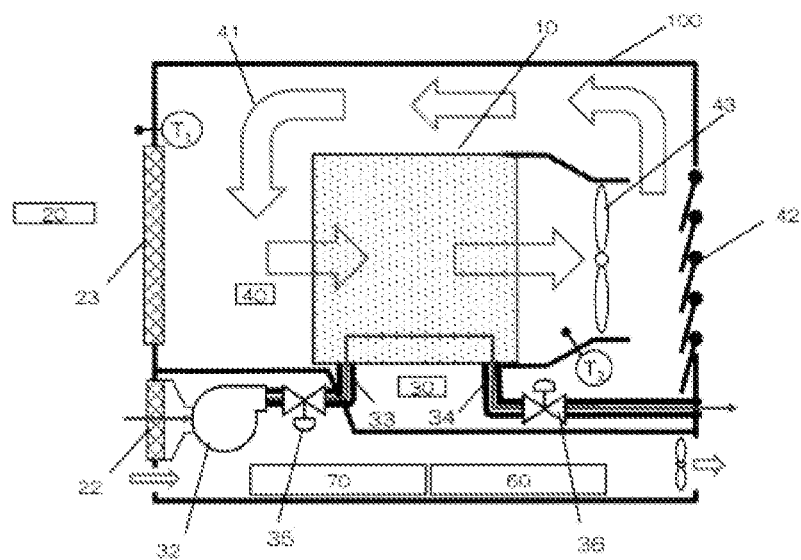
FIG. 4 is a schematic configuration diagram of another example of the air-cooled fuel cell system of the present disclosure, and it is also a diagram showing another example of the circulation mode.

FIG. 4 is a schematic configuration diagram of another example of the air-cooled fuel cell system of the present disclosure, and it is also a diagram showing another example of the circulation mode. Of the components shown in FIG. 4, the same components as FIG. 1 are allotted with the same numbers as FIG. 1 and will not be described here for simplicity.

In the air-cooled fuel cell system of FIG. 4, an air system 20 includes a reaction air inlet 22 configured to supply air to the oxidant gas system 30, and a cooling air inlet 23 configured to supply air to the cooling system 40. Each of the reaction air inlet 22 and the cooling air inlet 23 includes a filter.

Each of the oxidant gas system 30 and the cooling system 40 takes in air from the atmosphere through the filter.

The oxidant gas system 30 includes a filter 31, a reaction air supplier 32, a reaction air supply flow path 33, a reaction air discharge flow path 34, a first valve 35 and a second valve 36.

In the reaction air supply flow path 33, the filter 31, the reaction air supplier 32 and the first valve 35 are disposed along the direction of air flow.

The second valve 36 is disposed in the reaction air discharge flow path 34.

In the air-cooled fuel cell system shown in FIG. 4, auxiliary components such as the reaction air supplier 32, a controller 60 and a converter 70 are isolated from a cooling air circulation flow path 41.

Figure 5:
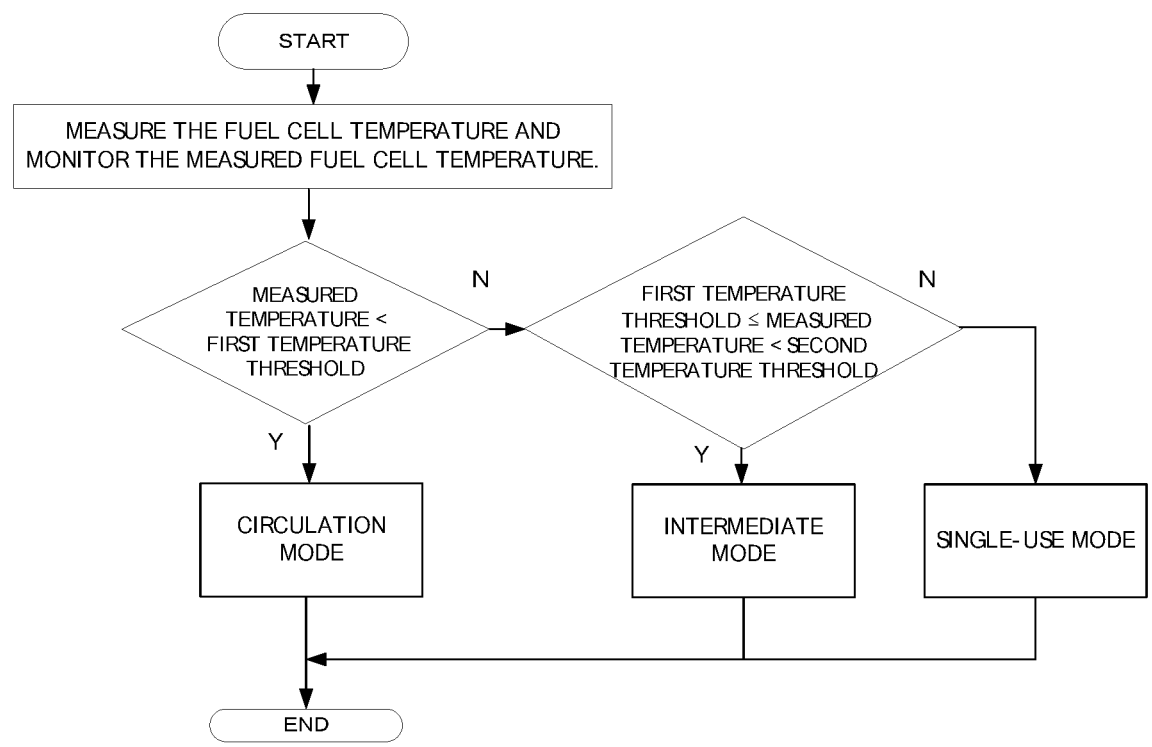
FIG. 5 is a flowchart of an example of the control of the air-cooled fuel cell system of the present disclosure.

FIG. 5 is a flowchart of an example of the control of the air-cooled fuel cell system of the present disclosure.

The controller monitors the temperature measured by the temperature acquirer during the operation of the fuel cell.

When it is determined that the inside air temperature measured by the temperature acquirer is less than the predetermined first temperature threshold, the controller executes the circulation mode.

When it is determined that the inside air temperature measured by the temperature acquirer is the predetermined first temperature threshold or more and less than the predetermined second temperature threshold, the controller executed the intermediate mode.

When it is determined that the inside air temperature measured by the temperature acquirer is the predetermined second temperature threshold or more, the controller executes the single-use mode.

REFERENCE SIGNS LIST

10. Fuel cell
20. Air system
21. Air inlet
22. Reaction air inlet
23. Cooling air inlet
30. Oxidant gas system
31. Filter
32. Reaction air supplier
33. Reaction air supply flow path
34. Reaction air discharge flow path
35. First valve
36. Second valve
40. Cooling system
41. Cooling air circulation flow path
42. Opening and closing unit
43. Cooling air driver
60. Controller
70. Converter
100. Housing
T1. Outside temperature sensor
T2. Temperature acquirer

The invention claimed is:
1. An air-cooled fuel cell system,
wherein the air-cooled fuel cell system comprises:
a fuel cell,
a reaction air supplier configured to supply reaction air to a reaction air inlet of the fuel cell,
a reaction air supply flow path configured to connect the reaction air supplier and the reaction air inlet of the fuel cell,
a reaction air discharge flow path configured to connect a reaction air outlet of the fuel cell and the outside of the air-cooled fuel cell system,
a housing,
an outside temperature sensor;
a temperature acquirer configured to acquire a temperature of inside air discharged from a cooling air outlet, and
a controller;
wherein the fuel cell has a structure that a reaction air manifold and a cooling air manifold are independent of each other;
wherein the housing houses the fuel cell, the reaction air supplier, the reaction air supply flow path, the reaction air discharge flow path and the temperature acquirer;
wherein the housing includes a cooling air circulation flow path configured to connect the cooling air outlet of the fuel cell and a cooling air inlet of the fuel cell;
wherein the cooling air circulation flow path includes a cooling air driver disposed downstream from the cooling air outlet of the fuel cell and configured to supply cooling air to the cooling air inlet of the fuel cell;
wherein the housing includes an air inlet and an air outlet;
wherein a filter is disposed at each of the air inlet and an inlet of the reaction air supply flow path;
wherein the air outlet includes an opening and closing unit;
wherein, based on the temperature measured by the temperature acquirer, the controller is configured to control opening and closing of the opening and closing unit and an opening degree thereof; and
wherein, when it is determined that an outside temperature is less than a predetermined first temperature threshold, the controller is configured to circulate the cooling air in the housing by controlling the opening degree of the opening and closing unit to 0% or more and less than 5%;
wherein, when it is determined that the outside temperature is the predetermined first temperature threshold or more and less than a predetermined second temperature threshold, the controller is configured to circulate part of the cooling air in the housing by controlling the opening degree of the opening and closing unit to 5% or more and 90% or less; and
wherein, when it is determined that the outside temperature is the predetermined second temperature threshold or more, the controller is configured to discharge the cooling air to the outside of the housing by controlling the opening degree of the opening and closing unit to more than 90% and 100% or less.
2. The air-cooled fuel cell system according to claim 1, wherein the predetermined first temperature threshold is 0° C. or less, and
wherein the predetermined second temperature threshold is 10° C. or more.

* * * * *